Feb. 5, 1929.
H. E. CURTIS
VEHICLE SPRING CONSTRUCTION
1,701,231
Filed June 29, 1926
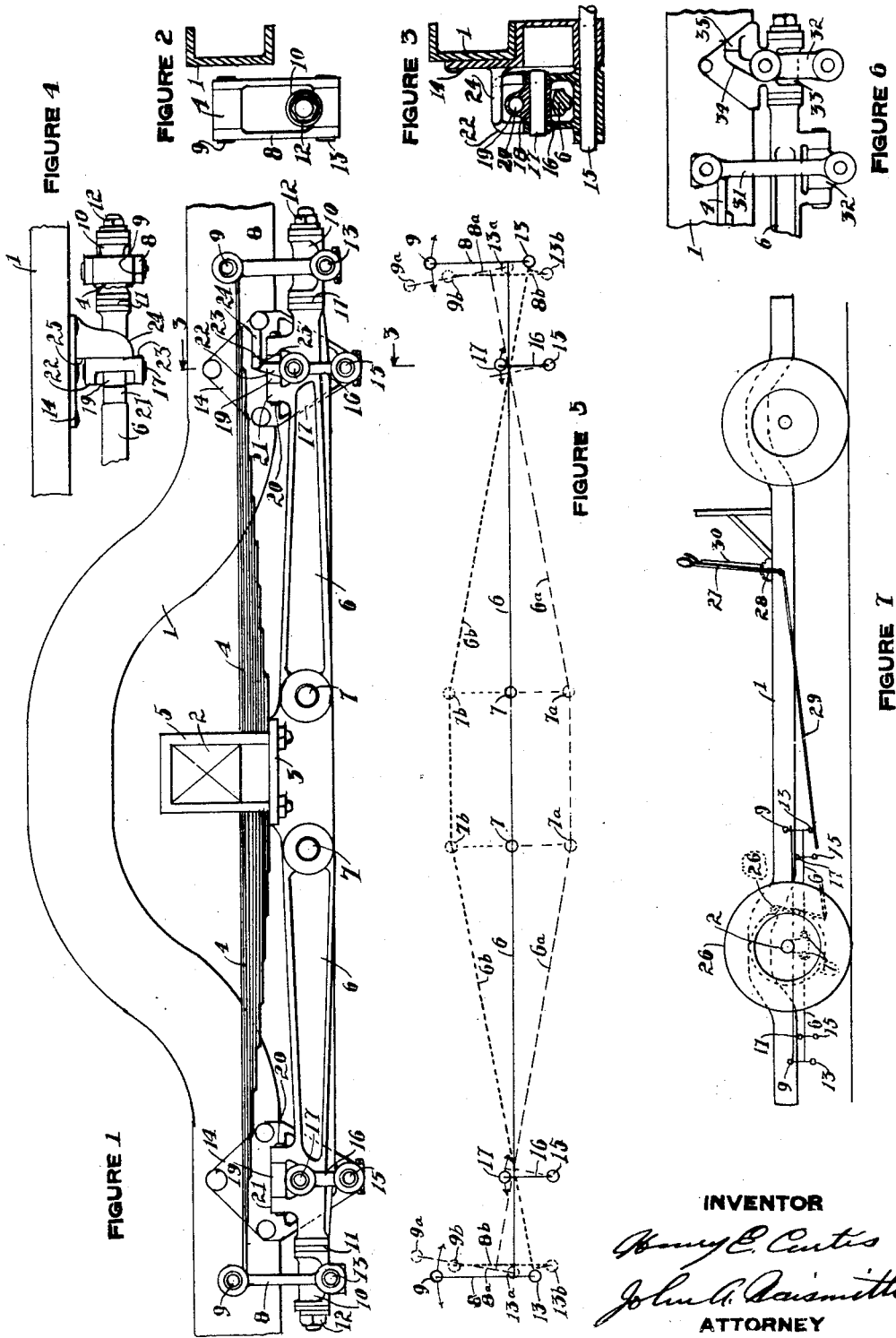
INVENTOR
Henry E. Curtis
John A. Naismith
ATTORNEY Patented Feb. 5, 1929.

1,701,231

UNITED STATES PATENT OFFICE.

HENRY E. CURTIS, OF SAN JOSE, CALIFORNIA, ASSIGNOR OF ONE-HALF TO JOHN H. BETTS, OF LONG BEACH, CALIFORNIA.

VEHICLE SPRING CONSTRUCTION.

Application filed June 29, 1926. Serial No. 119,379.

The present invention relates particularly to the spring suspension of a vehicle body, and is particularly applicable to motor vehicles designed to carry heavy loads, especially those types of vehicles wherein the load constantly fluctuates between zero and many thousand pounds.

In the usual form of construction of the vehicle the supporting springs have practically free movement throughout the wide range of loads placed thereon, consequently when the vehicle is lightly loaded the springs do not provide the required resiliency, it being necessary to design the springs to properly carry a capacity load.

It is one object of the invention to provide a means for mounting the vehicle frame upon the springs in such a manner as to automatically place the springs under a predetermined minimum load at all times without interference with their freedom of action under greater loads, and utilizing their resiliency to the greatest advantage when under light loads.

It is another object to provide a structure of the character indicated that will effectively absorb the sudden jars and vibrations occasioned by moving the vehicle over uneven ground, and effectively and smoothly break the rebound of the body after a sudden spring compression.

It is still another object of the invention to provide a structure of the character indicated that will secure the desired results without the use of the customary supplementary springs or resilient elements now commonly inserted between the main spring and supported body.

It is also an object to provide a device of the character indicated that will permit a limited rocking movement of the motor frame without twisting the springs.

Still a further object of the invention is to provide a structure wherein the inertia of the moving vehicle body may be utilized in the operation of the vehicle braking mechanism.

Finally, it is an object of the invention to provide a flexible structure of the character indicated that will be simple in form, economical to manufacture, and highly efficient in its practical application.

In the drawing:—

Figure 1 is a side elevation of a structure embodying my invention.

Figure 2 is an elevation of one end of the device partly in section.

Figure 3 is a sectional view on line 3—3 of Figure 1.

Figure 4 is a plan view of one end of the device.

Figure 5 is a diagram illustrating the mode of operation of the device.

Figure 6 is a detail illustration of a portion of another embodiment of the invention.

Figure 7 is a diagrammatical illustration of the device as used in conjunction with a braking mechanism.

Referring more particularly to the drawing I show at 1 a portion of a side bar of a motor vehicle frame, with the vehicle axle being indicated at 2.

On the axle 2 is mounted a member 3 carrying the leaf spring 4 at its center by means of clips 5, and in the front and rear portions of member 3 are mounted arms 6 by means of pivot pins 7.

Each arm 6 extends in parallel relation to the spring 4 and of course below the same as shown, so that both the spring and arm move in the same plane. The ends of the spring and lever arm are connected by means of a shackle 8 mounted on the spring by means of a pin 9 and connected to the end of the arm 6 through the medium of an element 10. The element 10 is pivotally mounted on the end of arm 6 in axial alignment with the longitudinal axis of the said arm, and is held against axial movement relative to the arm by shoulder 11 and nut 12 carried thereby. The connection between shackle 8 and element 10 is by means of a pivot pin 13 lying at right angles to the axis of arm 6 and below the same.

At 14 is shown a bracket rigidly mounted on the side bar 1 and extending a distance therebelow. In the lower portion of the bracket is revolubly mounted a rod 15 extending outwardly therefrom a distance as shown and also extending across the vehicle frame and through a similar bracket on the opposite side thereof but not here shown.

On the outwardly projecting end of rod 15 is mounted a shackle element 16 the upstanding parts of which carry a pin 17 in parallel relation to the rod 15. On pin 17 is pivotally mounted an element 18 having a centrally positioned upstanding portion 19 which revolubly engages a pin 20 positioned at right angles to pin 17 and lying in the plane of arm 6 and spring 4. On the arm 6 are formed spaced upstanding ears, one on either side of portion 19 and supporting the ends of pin 20.

Formed integrally with the shackle element 16 and extending upwardly therefrom in substantial alignment therewith is a bracket 22, this bracket straddling the portion 19 and having a forwardly projecting face 23. A bracket is also formed as at 24 on bracket 14 and having a face 25 formed thereon in opposed relation to face 23 and normally in engagement therewith.

The driving wheels 26 being put in motion the movement is transmitted directly through the axle 2, lever arm 6, and parts 20, 19, 18, and 17 to shackle 16. Since the shackle 16 is connected directly with the frame 1 by the rod 15 at one end and the brackets 19—24 at the other end, the said frame is moved as a unit with the axle. While the spring, therefore, carries the weight of the frame 1 and controls its action relative to the axle 2 it plays no material part in transmitting a forward or reverse movement to the frame.

The function of the spring can best be understood by an examination of the diagram in Figure 5, the point 15 being a fixed point on the frame of the motor, and the solid lines indicating given relative positions of the several parts, when under load and the spring flattened out.

Supposing now that the point 7 drops a distance relative to the frame, as to 7ª. The lever 6 moves to the position 6ª, and the parts 13, 8 and 9 swinging to positions 13ª, 8ª and 9ª as shown. The reaction carries the several parts to the positions indicated by similar numerals followed by the letter "b". It should be noted that the load is at all times applied at the point 15 which is remote from fulcrum of the lever 6, the greater portion of the weight being carried to the spring 4 through shackle 8 from the short end of the lever, the long end of the lever being pivotally mounted upon the same element carrying the central portion of the spring.

The several pivotal points 7, 17, 15, 13 and 9 permit great flexibility of movement of the spring and lever and yet the leverage is such that the action of the spring is smooth and perfectly controlled. In addition to the above movements the lever 6 has pivotal connections with the element 18 and the shackle 8 whereby to permit a rocking movement of the frame without twisting the lever arm.

The two halves of the device extending to the front and rear of the axle are symmetrical in every detail, except that the forward portion only is fitted with the driving connection 22, 23, 24, 25, and this connection plays an important part in the braking of the vehicle.

A suitable brake of any desired type is indicated at 26, and this brake is operated by means of a lever 27 pivotally mounted on the frame at 28, and connected to the brake arm by a rod 29. The brake lever may of course be held in any given position by any suitable locking device as 30.

If, now, the vehicle is travelling at high speed and the brake lever is suddenly thrown back to apply the brake 26, the sudden slowing of the wheels causes the frame 1 to lurch forward relative to the axle 2 and parts connected thereto. This sudden forward movement of the frame of course carries the brake lever forward also and accentuates its pull upon the brake arm. When a sudden stop is desired, therefore, the strength of the driver of the machine is reinforced by the inertia of the entire frame and load. This forward movement of the frame relative to the axle is permitted by the construction 22—23, 24, 25, the brackets 22—24 normally being in driving contact as the wheels urge the vehicle forward, but the moment the inertia of the frame exceeds that of the axle and parts carried thereby the bracket 24 is permitted to move away from the bracket 22. This relative movement of the brackets is readily effected because of the pivotal connections between the spring 4, lever 6 and frame 1.

In Figure 6 I show an embodiment of the invention wherein the end of the spring 4 is connected to the lever 6 at a point near its end by a shackle 31 through the medium of a pivoted element 32. In this embodiment the end of the lever is pivotally connected to the frame 1 through the medium of a shackle 32 and pivoted element 33, the shackle 32 having a separable engagement with the frame by means of parts 34—35 similar to parts 22—24 heretofore described. The action of this form of the invention is similar to that of the form above described, the fulcrum of the lever being in the same place but the points of application of the weight and power being reversed.

It is to be understood, of course, that while I have herein shown and described but two specific embodiments of the invention, changes in form, construction and method of operation may be made within the scope of the appended claims.

I claim—

1. A structure of the character described including a vehicle frame and axle, a spring mounted on the axle, a lever having a pivotal connection with the axle, a shackle connection between the spring and lever, driving means inserted between the lever and frame, and means for permitting the inertia of the forwardly moving frame to advance itself relative to the axle and said driving means upon suddenly arresting the forward movement of said axle.

2. In a structure of the character described, a vehicle frame, an axle and driving gear operatively mounted thereon, braking mechanism inserted between the frame and driving gear, driving means inserted between the axle and frame, and yieldable means inserted in said driving means whereby the operation of said braking mechanism will permit the inertia of the forwardly moving frame to advance itself relative to the axle and driving gear and still further actuate the braking mechanism.

3. A structure of the character described including an axle, a spring mounted thereon, a lever pivotally mounted thereon in parallel relation to said spring, a shackle pivotally connecting said spring and lever at points remote from their connections to said axle, a bracket mounted on said frame at a point adjacent to said shackle, a second shackle pivotally mounted on said bracket, a pivotal connection between said last mentioned shackle and said lever, and means inserted between said bracket and lever to limit its pivotal movement in one direction.

4. A spring mounting for vehicles, comprising a lever inserted between the vehicle frame and axle and pivotally connected thereto whereby to permit movement of the frame relative to the axle in parallel relation to the path of travel of the vehicle, a spring mounted on said axle in spaced relation to said lever, a shackle connecting said spring and lever at points remote from their mounting on said axle, and means inserted between the frame and lever for limiting the movement of the frame relative to the axle in one direction.

5. A spring mounting for vehicles, comprising a spring mounted upon the vehicle axle and extending longitudinally of the vehicle frame, a lever pivotally connected to the vehicle axle at one end and lying beneath the spring, a shackle connecting the adjacent ends of the spring and lever, and frame supporting means mounted on the lever between its pivoted end and said shackle.

6. A spring mounting for vehicles comprising a spring mounted upon the vehicle axle and extending longitudinally of the vehicle frame, a lever pivotally connected to the vehicle axle at one end and lying beneath the spring, a shackle pivotally connected to the spring at the end remote from the axle and to the adjacent end of the lever below its longitudinal axis, a second shackle pivotally mounted on the lever above its longitudinal axis and depending therebelow, and a pivotal connection between the lower end of the second shackle and the vehicle frame.

7. A spring mounting for vehicles comprising the structure set forth in claim 6 and including a driving connection inserted between the second shackle and the vehicle frame.

8. A spring mounting for vehicles comprising the structure set forth in claim 6 and including an upstanding part mounted on the second shackle and extending above its pivotal connection to the lever, and a stop mounted on the vehicle frame to engage the said part.

HENRY E. CURTIS.